Patented June 19, 1945

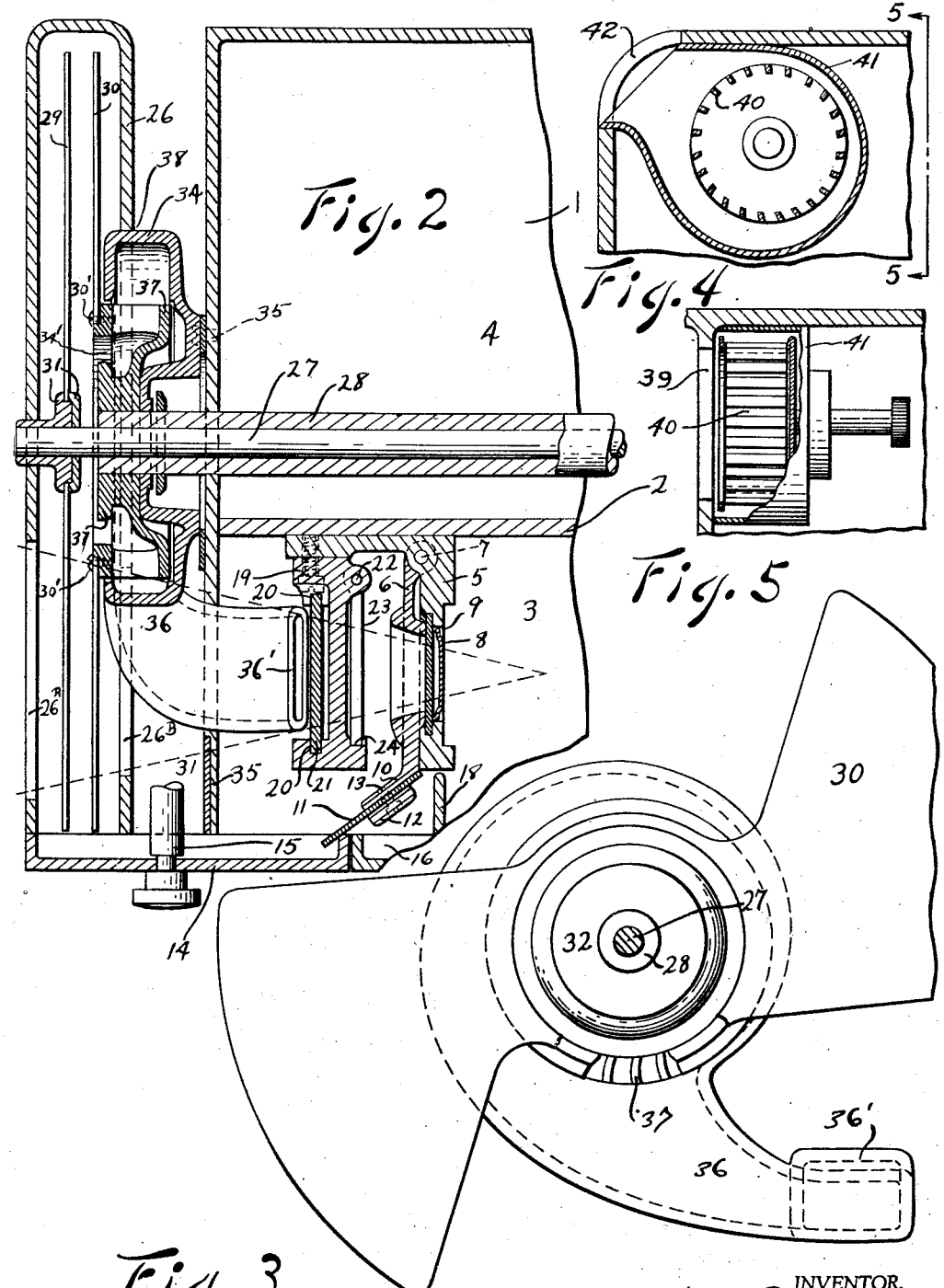

2,378,682

UNITED STATES PATENT OFFICE 2,378,682

VENTILATING SYSTEM FOR MOTION-PICTURE PROJECTORS

Karl Brenkert, Detroit, Mich., assignor to Brenkert Light Projection Company, Detroit, Mich., a corporation of Michigan Application May 29, 1942, Serial No. 444,979

2 Claims. (Cl. 88—17)

The present invention pertains to a novel ventilating system for a motion picture projector and has for its general object the provision of means for effectively and efficiently cooling the aperture plate.

In Patent No. 2,194,585 of March 26, 1940, assigned to the Brenkert Light Projection Company, there is shown a suction system which depends for its effectiveness on closing off the cooling chamber from the remainder of the film compartment in order to avoid drawing unused currents of air from this remaining portion of the film compartment. In practice however, it is difficult to avoid leakage of air to the suction fan. While it is possible to close off the cooling chamber from the forward remaining portion of the film compartment, this requires accurate and expensive machining and assembling in order to realize the maximum effectiveness. Accordingly, one of the more particular objects of this invention is to provide a cooling system that does not require such complete closing off of the cooling chamber.

This and other objects of the invention are accomplished by positively blowing air against the aperture plate rather than drawing air over it by suction. Once the air is blown against the plate, the path subsequently taken by the air is comparatively immaterial. In the case of suction, however, air will be drawn from all available points, and this is the condition requiring such complete closing off of the cooling chamber in the suction system disclosed in the aforementioned patent.

Another problem in connection with efficient air cooling is to mount a sufficiently large blower conveniently on the projector head, for unless these conditions are filled, the system would not be acceptable in the industry. For example, the blower as a separate unit from the head or awkwardly mounted on the head would not be satisfactory. Again, the conventional dimensions of a projector head and the standard distances between various parts thereof are limitations that must be considered in mounting the blower on the head.

These considerations are recognized and satisfied in the present invention by positioning the blower between the shutter and the rear wall of the head. Moreover, this position enables the rotor of the blower to be mounted directly on the shutter shaft, and a shutter blade is in fact attached directly to the rotor. Neither does the blower interfere with the use of a double shutter, there being provided a second shutter shaft within the shaft that carries the previously mentioned shutter and rotor.

The blower housing clears the light port and yet may be of ample size without protruding beyond the margins of the projector head. This housing is of convolute formation and terminates in a nozzle directed laterally and upwardly toward the aperture plate. Any currents that may be deflected rearwardly from the plate are shielded from the arc lamp by the rapidly rotating double shutter. Also, for more efficient operation, an exhaust fan may be provided at the top of the aperture plate, although this is not essential.

The invention is fully disclosed by way of example in the following description and in the accompanying drawings in which Figure 1 is a side elevation of the projector on the film side with the door removed, certain parts being shown in sections;

Figure 2 is a fragmentary plan section;

Figure 3 is an end view approximately on the line 3—3 of Figure 1;

Figure 4 is a detailed vertical section on a plane behind that appearing in Figure 1, and Figure 5 is a section on the line 5—5 of Figure 4.

Reference to these views will now be made by use of like characters which are employed to designate corresponding parts throughout.

Figure 1:
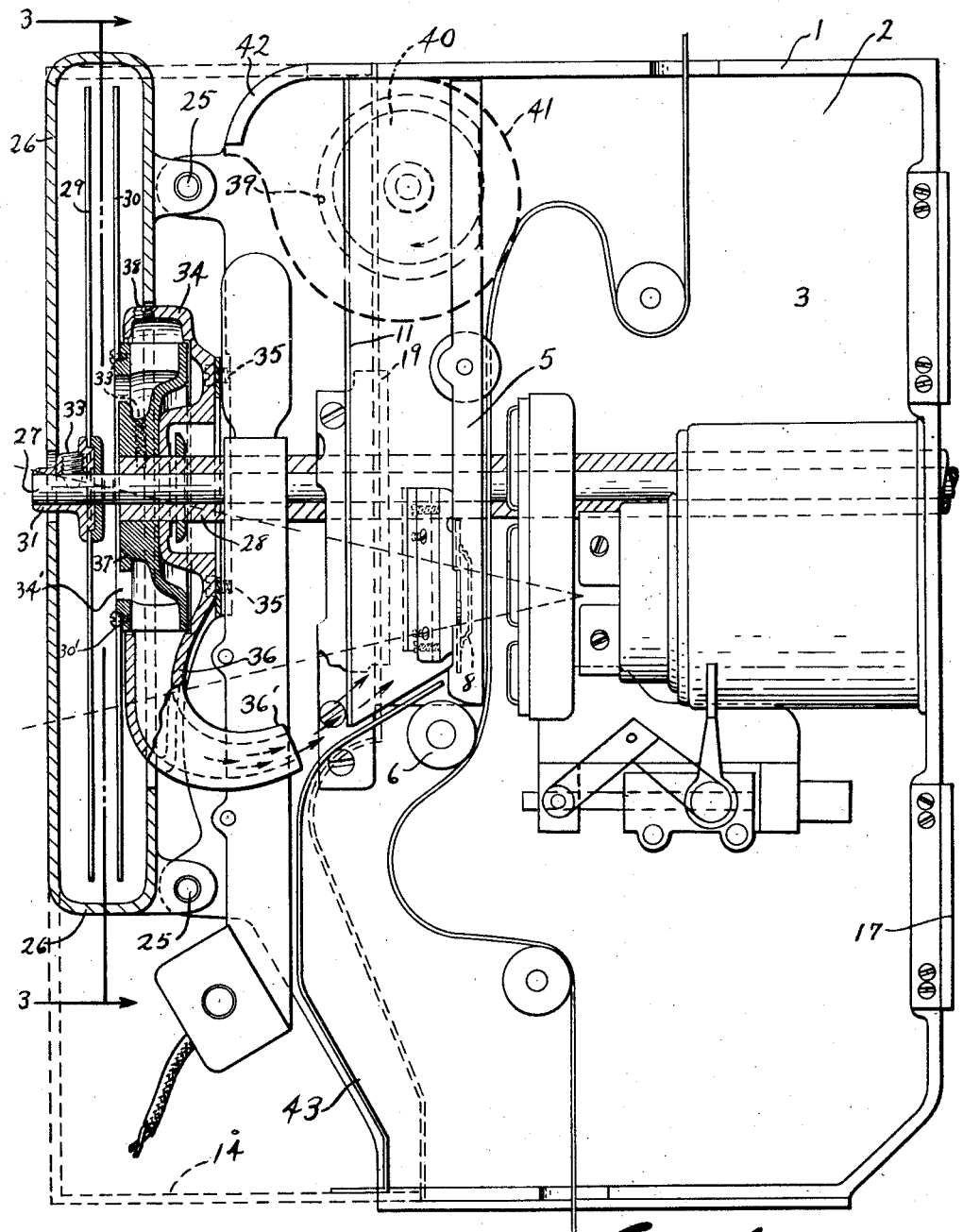

The projector disclosed herein is contained, for the most part, in a housing 1 similar to that shown in my Patent No. 2,194,585 of March 26, 1940, assigned to Brenkert Light Projection Company. The operating mechanism within the housing is also similar to that shown in the patent, and a detailed description thereof is not considered necessary inasmuch as the invention does not pertain directly thereto. However, whereas the patent shows a single shutter, the device disclosed herein has a double shutter as fully described in my Patent No. 2,229,237 of January 21, 1941, also assigned to Brenkert Light Projection Company.

Within the housing 1 is provided the usual partition 2 extending from front to rear and dividing the housing into a film compartment 3 and a mechanism compartment 4 as shown in Figure 2. On the partition 2 is mounted the aperture plate 5 extending into the film compartment and lying between the intermittent sprocket 6 and the top of the housing. The film is threaded in the usual manner, as shown in my Patent No. 2,194,585 and in operation is engaged by a gate as also shown in said patent.

To the rear side of the aperture plate or film guide 5 is attached an aperture retaining plate 6 at a hinge 7. This member retains a removable apertured member 8 inserted in the aperture 9 of the plate 5. The outer vertical edge portion of the member 6 is bent at an angle rearwardly as indicated by the numeral 10 in order to carry an air and light shield 11 which also extends to the top of the housing 1. The member 11 is clamped to the portion 10 by means of a thumb pad 12 of Bakelite or similar material and a screw 13. The shield 11 engages a panel 14 held to the housing by screws 15, while the door 16 hinged to the housing at 17 carries a fin 18 nearly contacting the aperture plate 5 when the door is closed.

As shown in Figure 2, the member 5 is right angular in shape with one side lying against the partition 2. To this side is fastened an outwardly extending frame member 19 with opposed grooves 20 receiving a slidable change-over shutter 21. Forward of this shutter, the frame 19 carries a vertical rod 22 on which slides one edge of a fire shutter 23, the opposite edge being received in a groove 24 in the member 19.

On the rear end of the housing are mounted upper and lower horizontal rods 25 for the purpose of supporting a shutter guard 26. One end of this guard is closed by the panel 14 as shown in Figure 2.

In the mechanism compartment 4 are journalled two concentric shafts 27 and 28 as in Patent No. 2,229,237. The shaft 27 extends into the guard 26 and carries the shutter blade 29 by means of a hub 31 and a clamp 32. The hub is fixed to the shaft by a screw 33.

Both sides of the shutter guard have openings 26a and 26b to provide an unobstructed converging light path to the aperture member 8 when the shutters 21 and 23 are raised in the normal running of the machine. The shutter shafts are to one side of the openings 26a and 26b and the shutter blades, running in opposite directions, intercept the openings.

Concentric with the shafts 27, 28 a blower housing 34 is fastened to the rear wall of the housing by bolts 35. The housing is formed with a discharge duct 36 extending downwardly and laterally from the housing and terminating in a forwardly extending nozzle 36' directed towards the lower edge of the aperture 9. Within the housing 34 is a suitable hollow rotor or impeller 37 secured on the outer shaft 28 by a screw 33'. Another shutter blade 30, also within the guard 26, is fastened to the outer side of the rotor by screws 30'. The shutter is so shaped and located, as shown in Figure 3, that it clears the open side 34' of the rotor, thereby permitting free access of air to the interior thereof. The inner or forward wall of the shutter guard has an opening 38 in which the housing 34 is received, so that this housing is partly contained within the shutter guard for economy of space.

A suitable exhaust port may be provided in the top of the housing at the rear side of the aperture plate 5 to discharge the current of air that has absorbed the heat from the aperture plate and associated parts. In the construction shown an opening 39 is formed in the partition 3 adjacent to the upper end of the aperture plate, and behind this opening is mounted an impeller or rotor 40 in the mechanism chamber 4. The impeller rotates in a suitable shroud 41 discharging through an opening 42 in the top of the housing.

The portion of the film compartment rearward of the plate 5 may be designated as the cooling chamber. The plate 5, extending substantially to the top of the housing 1, in conjunction with the shield 11 of the same extent and engaging the lateral wall or panel 14, prevents dissipation of the air current into the forward portion of the film compartment. The fin 18 contributes to the same result either in conjunction with or as an alternate to the shield 11. When the shield is employed, the fin may be omitted, if desired.

As previously stated, one of the problems in connection with aperture plate cooling is the avoidance of arc disturbance. This problem is successfully met in the present construction by directing the air current forwardly as well as upwardly. Because of the provision of this current, the shutter blades can be of the flat or non-blowing type which do not disturb the arc, even without the use of a protective glass between the lamp housing and the shutter. Any currents that may be deflected rearwardly from the aperture plate are effectively broken up by this type of shutter so that they do not reach the arc in sufficient strength to disturb it. The deflected currents are reduced considerably or virtually eliminated if the exhaust impeller 40 is employed.

Another difficulty in providing an auxiliary cooling system is to mount the fan or blower conveniently while maintaining the standard distances between the arc, shutter and aperture plate. This difficulty is overcome in the present instance by mounting the impeller on the shutter shaft and in close proximity to the shutter, or partially within the shutter guard. In this position the inlets to the impeller are offset laterally from the light beam, and the intake currents are therefore less likely to disturb the arc. The arc is further protected from these currents by the intervening shutter in the manner set forth above with regard to deflected currents.

A baffle 43 extends from the lower edge of the aperture plate 5 to the bottom of the housing and across the entire width of the film compartment, thereby completing the isolation of the cooling chamber. This separation, which includes the aperture plate 5 extending to the top of the housing, reduces the fire hazard by keeping the draft out of the film-containing or forward portion of the film compartment.

Although a specific embodiment of the invention has been illustrated and described, it will be understood that alterations in the details of construction may be made without departing from the scope of the invention as indicated by the appended claims.

What I claim is:

1. In a motion picture machine, a housing, an aperture plate therein, an impeller housing supported in spaced relation to said aperture plate, said impeller housing having spaced lateral walls substantially parallel to the plane of said aperture plate and an intervening peripheral wall, a nozzle extending from said impeller housing and directed towards said aperture plate, an impeller rotatably mounted in said impeller housing and having blades disposed entirely within said impeller housing, said impeller having a portion extending through the lateral wall of said impeller housing that is more remote from said aperture plate, said impeller having an air inlet on the side thereof more remote from said aperture plate, and a disk shutter attached to the same side of said impeller, and disposed externally of said impeller housing and radially outward of said air inlet.

2. In a motion picture machine, a housing, an aperture plate therein, an impeller housing supported in spaced relation to said aperture plate, said impeller housing having spaced lateral walls substantially parallel to the plane of said aperture plate and an intervening peripheral wall, a nozzle extending from said impeller housing and directed towards said aperture plate, an impeller rotatably mounted in said impeller housing and having blades disposed entirely within said impeller housing, said impeller having a portion extending through the lateral wall of said impeller housing that is more remote from said aperture plate, said impeller having an air inlet on the side thereof more remote from said aperture plate, and a disk shutter attached to the same side of said impeller, and disposed externally of said impeller housing and radially outward of said air inlet, and a guard enclosing said shutter and a portion of said impeller housing.

KARL BRENKERT.